US009057849B2

(12) United States Patent
Park et al.

(10) Patent No.: US 9,057,849 B2
(45) Date of Patent: Jun. 16, 2015

(54) OPTICAL FIBER CONNECTOR AND AN ASSEMBLY METHOD FOR THE SAME

(75) Inventors: Chan Soul Park, Daejeon (KR); Kwang Cheon Lee, Yongin-si (KR); Sang Chul Jun, Chungcheongbuk-do (KR); Jun Young Park, Daejeon (KR)

(73) Assignee: ILSIN OTS CO., LTD., Daejeon (KR)

( * ) Notice: Subject to any disclaimer, the term of this patent is extended or adjusted under 35 U.S.C. 154(b) by 278 days.

(21) Appl. No.: 13/522,933

(22) PCT Filed: Aug. 25, 2010

(86) PCT No.: PCT/KR2010/005713
§ 371 (c)(1),
(2), (4) Date: Jul. 18, 2012

(87) PCT Pub. No.: WO2012/005407
PCT Pub. Date: Jan. 12, 2012

(65) Prior Publication Data
US 2012/0288238 A1 Nov. 15, 2012

(30) Foreign Application Priority Data
Jul. 8, 2010 (KR) ........................ 10-2010-0065973

(51) Int. Cl.
*G02B 6/38* (2006.01)
(52) U.S. Cl.
CPC .......... *G02B 6/3846* (2013.01); *Y10T 29/49826* (2015.01); *G02B 6/3821* (2013.01); *G02B 6/3823* (2013.01); *G02B 6/3893* (2013.01)
(58) Field of Classification Search
CPC ........................... G02B 6/3846; G02B 6/3823

USPC ............................................. 385/99
See application file for complete search history.

(56) References Cited

U.S. PATENT DOCUMENTS

| 5,963,692 | A  | * | 10/1999 | Marazzi et al. | ................. | 385/80  |
| 6,668,128 | B2 | * | 12/2003 | Hattori et al.  | ................. | 385/136 |
| 6,827,508 | B2 | * | 12/2004 | Stowe          | ................. | 385/96  |
| 7,467,899 | B2 | * | 12/2008 | Akiyama        | ................. | 385/96  |
| 7,712,974 | B2 | * | 5/2010  | Yazaki et al.  | ................. | 385/87  |
| 7,726,886 | B2 | * | 6/2010  | Akiyama        | ................. | 385/96  |
| 7,815,377 | B2 | * | 10/2010 | Doss et al.    | ................. | 385/98  |

(Continued)

FOREIGN PATENT DOCUMENTS

| JP | 2006-184491    | 7/2006 |
| KR | 10-0582690     | 5/2006 |
| KR | 10-2009-0083373 | 8/2009 |

OTHER PUBLICATIONS

International Search Report for PCT/KR2010/005713 Mailed on Oct. 24, 2011.

*Primary Examiner* — Rhonda Peace
(74) *Attorney, Agent, or Firm* — Revolution IP, PLLC

(57) ABSTRACT

The present invention relates to an optical fiber connector whereby an operator can easily couple optical fibers on site, and to an assembly method for the same. More specifically the invention relates to: an optical fiber connector wherein a guide ferrule bush is provided between a ferrule and a coil spring so as to be able to solve a problem whereby a ferrule optical fiber between a ferrule body and a reinforcing sleeve is bent, and a problem whereby contact between the ferrule body and the ferrule optical fiber is broken due to frequent movement, when the ferrule moves within a range of movement provided for by a resilient member due to the resilient member; and to an assembly method for the same.

17 Claims, 20 Drawing Sheets

(56) References Cited

U.S. PATENT DOCUMENTS

| | | | |
|---|---|---|---|
| 7,934,874 B2* | 5/2011 | Honma et al. | 385/97 |
| 8,043,013 B2* | 10/2011 | Lichoulas et al. | 385/99 |
| 8,047,726 B2* | 11/2011 | Tamekuni et al. | 385/60 |
| 8,092,100 B2* | 1/2012 | Song et al. | 385/99 |
| 8,118,495 B2* | 2/2012 | Yazaki et al. | 385/87 |
| 8,317,406 B2* | 11/2012 | Tamekuni et al. | 385/72 |
| 8,459,880 B2* | 6/2013 | Castonguay et al. | 385/78 |
| 8,509,587 B2* | 8/2013 | Song et al. | 385/135 |
| 8,596,887 B2* | 12/2013 | Song et al. | 385/96 |
| 2002/0031323 A1* | 3/2002 | Hattori et al. | 385/137 |
| 2005/0213897 A1* | 9/2005 | Palmer et al. | 385/95 |
| 2007/0172179 A1* | 7/2007 | Billman et al. | 385/99 |
| 2007/0196054 A1* | 8/2007 | Palmer et al. | 385/75 |
| 2008/0019646 A1* | 1/2008 | deJong | 385/99 |
| 2008/0282522 A1* | 11/2008 | Song et al. | 29/33.52 |
| 2009/0022457 A1* | 1/2009 | de Jong et al. | 385/96 |
| 2009/0162019 A1* | 6/2009 | Lichoulas et al. | 385/99 |
| 2009/0238523 A1* | 9/2009 | Honma et al. | 385/96 |
| 2009/0269014 A1* | 10/2009 | Winberg et al. | 385/78 |
| 2010/0272405 A1* | 10/2010 | Song et al. | 385/96 |
| 2010/0284653 A1* | 11/2010 | Tamekuni et al. | 385/60 |
| 2012/0288238 A1* | 11/2012 | Park et al. | 385/80 |
| 2013/0156382 A1* | 6/2013 | Park | 385/78 |

* cited by examiner (a)

(b)

a (a)

(b)

(a)  (b)

OPTICAL FIBER CONNECTOR AND AN ASSEMBLY METHOD FOR THE SAME

RELATED APPLICATIONS

This application is a 371 application of International Application No. PCT/KR2010/005713, filed Aug. 25, 2010, which in turn claims priority from Korean Patent Application No. 10-2010-0065973, filed Jul. 8, 2010, each of which is incorporated herein by reference in its entirety.

TECHNICAL FIELD

The present invention relates to an optical fiber connector and a method for assembling the same, and in particular to an optical fiber connector and a method for assembling the same which are directed to installing a guide ferrule bush between a ferrule and a coil spring in an attempt to overcome the problems that an adhesion state of an adhesion part between a ferrule body and a ferrule optical fiber or a ferrule expander and a ferrule optical fiber due to a frequent movement when a ferrule moves within a permitted (given) range due to a ferrule elastic member is broken or a ferrule optical fiber between a ferrule body and a reinforcing sleeve is bent.

BACKGROUND ART

In recent years, FTTH (Fiber To The Home) designed to provide diverse information including broadcast information, communication information, etc. by connecting an optical fiber to an ordinary home is increasingly used at an apartment home and an ordinary housing. The optical cable in the FTTH system is extended to a home, one end of which is terminated with an optical fiber connector. The FTTH worker sets an optical cable a little longer about a few meters than an actual length in consideration with a splice between optical fibers and then is extended to a home. The worker cuts off an optical fiber by a needed length, and assemblies an optical fiber connector at its end and connects the connector with an optical adapter, thus installing the optical fiber.

The prior art patents 1 to 6 discloses diverse technologies with respect to an optical fiber connector coupled to an optical adapter.

One of the ordinary optical fiber connector is disclosed in a construction site assembling type optical connector of Korean patent registration publication No. 10-0669947 the invention of which is directed to connecting an end of a ferrule optical fiber with an end of a main optical fiber. The above patent discloses a splice method formed of a mechanical splice method connecting a main cable alignment member accommodating an end of a ferrule optical fiber and a, end of a main optical fiber, and a fusion splice method fusion-connecting an end of a ferrule optical fiber and an end of a main optical fiber by using an is optical fiber fusion connector and reinforcing a fusion splice part with a reinforcing sleeve formed of a thermal contraction tube (refer to prior arts 3 to 6).

The present invention is directed to a fusion splice method, and the optical fiber connector of the fusion splice method comprises a ferrule 1 formed of a ferrule optical fiber, an elastic member 2 elastically supporting the ferrule, a plug frame 4 accommodating the ferrule and elastic member, a stopper 3 installed at the plug frame and fixing the ferrule and the elastic member at the plug frame, a reinforcing sleeve 5 reinforcing the fusion splice part of an end of the ferrule optical fiber and an end of the main optical fiber, a plug handle 6, and a boot 7.

The optical fiber connector of the fusion splice method is characterized in that the ferrule I elastically by an elastic member, thus moving within a range set by the elastic member 2. When the ferule moves within a range set by the elastic member, an adhesion state between the ferrule body 1a and the ferrule optical fiber 1b might be worsened, or the ferrule optical fiber might be disconnected, which leads to a faster bending of part 1c of the ferrule optical fiber.

As shown in FIG. 1B, when the ferrule moves within a range set by the elastic member 2 by means of an external force, part 1b' of the ferrule optical fiber 1b between the ferrule body 1a and the reinforcing sleeve 5 bends, and the frequent movement of the ferrule body 1a contributes to causing a failure in the adhesion state between the ferrule body and the ferrule optical fiber, and the ferrule optical fiber might be disconnected, and when external force is applied to the ferrule body 1a, part of the ferrule optical fiber bends, and part of the shorter ferrule optical fiber bends, which expedites bending, thus causing a lot of problems in the efficiency of the optical fiber.

In the optical fiber connector of a conventional fusion splice method, when a fusion splice part is reinforced by heating a reinforcing sleeve formed of a thermal contraction tube, an adhesive used to integrally form a ferrule body and a ferrule optical fiber melts down, which leads to a transformation. In order to prevent the above problem, it is needed to make the ferrule exposed in minimum when assembling the optical fiber connector.

The cold peeling (at room temperature) is mainly performed when peeling a ferrule optical fiber in such a manner that the ferrule can be exposed, in minimum, to heat, so an adhered part of the ferrule might hurt as a large force (weight) is applied in the course of peeling of the ferrule optical fiber or the ferrule optical fiber is disconnected.

The problems of the conventional art will be described using the cited prior arts.

The optical fiber disclosed in the cited prior art 3 of Korean patent publication number 10-2009-0083373 is directed to obtaining compactness. A ferrule 7 and a reinforcing sleeve 15 are very close to each other. When it is intended to heat for a thermal contraction of a reinforcing sleeve, an adhesive used to integrally form an optical fiber to a ferrule used to be transformed.

The optical fiber disclosed in Japanese patent publication number 2008-225461 in the cited prior art 6 is characterized in that a protruded portion of a fixture coupled to a frame is provided, and an integrated construction is achieved in the course of a thermal contraction of a reinforcing sleeve, thus enhancing a tensional force. When a reinforcing sleeve is thermally contracted and then becomes integral with the protruded portion of the fixture, the fixture and the optical fiber of the ferrule become integral by means of the reinforcing sleeve. As shown in FIG. 1, when force (weight) is applied to the ferrule of the front side of the connector, the ferrule moves in a longitudinal direction of the optical fiber by means of the elastic member. At this time, a bending phenomenon occurs at a part 1b' of the shorter ferrule optical fiber 1b, so the optical fiber is disconnected, and short circuit problem occurs. Since a sharp angle bending occurs, a signal transmission loss might fast increase.

Te optical connectors of the prior art documents 3, 5 and 6 are directed to peeling the optical fibers at the factory, assembling to a ferrule with an adhesive and cutting and supplying the same to a construction site. When they are supplied in a non-peeled state, the ferrule optical fiber formed of ferrule and optical fiber which are bonded by an adhesive is needed to be peeled off at a construction site. In this case, a bonded portion becomes weak due to the weight occurring during peeling, so a transformation or short circuit problem occurs.

In addition, when the ferrule is peeled off from an optical fiber at a factory and an adhesive is bonded, and a necessary cutting is performed and supplied to a construction site, a manufacture cost increases due to a hard work, and a short circuit problem might occur when doing such works at the construction site.

The peeled optical fiber might be exposed to the air for a long time, so it might be contaminated by moisture or optical pollutant materials.

In order to overcome the above-described problems, the Japanese patent publication number 2009-69607 of the prior art document 5 discloses an invention on a packing technology providing a peeled optical fiber. In case that the optical fiber is supplied in a packed state, the manufacture cost increases, and since the entire volume of the products increase, which results in increasing transportation cost.

The reinforcing sleeve of FIG. 2 is directed to using a conventional optical connector formed of a double tube structure consisting of two thermal contraction tubes of an inner side tube 5a and an outer side tube 5b in which a thermal contraction time increases.

PRIOR ART DOCUMENTS (Prior art document 1) Prior at document 1: Koran patent registration publication number 10-0669947
(Prior art document 2) Prior at document 2: Korean patent registration publication number 10-2009-0078350
(Prior art document 3) Prior at document 3: Korean patent registration publication number 10-2009-0083373
(Prior art document 4) Prior at document 4: Korean patent registration publication number 10-2007-0045972
(Prior art document 5) Prior at document 5: Japanese patent publication number patent laid-open hei 2009-69607
(Prior art document 6) Prior at document 6: Japanese patent publication number patent laid-open hei 2008-225461

DISCLOSURE OF INVENTION

Accordingly, it is an object of the present invention to provide an optical fiber connector and a method for assembling the same which overcome the problems encountered in the conventional art and in which a ferrule optical fiber is supplied in a non-peeled state and is peeled off at a construction site and is assembled, thus preventing a unit cost increase problem.

It is another object of the present invention to provide an optical fiber connector which makes it possible to prevent a transformation of a ferrule due to a transformation of an adhesive between a ferrule body and a ferrule optical fiber due to a heat occurring when a reinforcing sleeve is heated in order to reinforce a fusion splice part of an optical fiber connector.

It is further another object of the present invention to provide an optical fiber which makes it possible to prevent a bending of a ferrule optical fiber between a ferrule body and a reinforcing sleeve when a ferrule moves within a moving range of an elastic member as it is supported by an elastic member, thus preventing the decrease of a short circuit and efficiency of a ferrule optical fiber occurring due to a bending of a ferrule optical fiber.

It is still further another object of the present invention to provide an optical fiber which makes it possible to overcome a problem that heating time for a thermal contraction of a reinforcing sleeve is long by making a double tube formed of a thermal contraction tube in a single tube type reinforcing sleeve.

It is still further another object of the present invention to provide a method for assembling an optical fiber connector at a construction site by using a thermal splice unit.

To achieve the above objects, there is provided an optical fiber connector which fusion-splices a ferrule optical fiber enclosed in a ferrule elastically supported by means of an elastic member, and a main optical fiber by using a fusion splice unit, and the fusion splice part is reinforced by a reinforcing sleeve, thus connecting a main optical fiber and a ferrule optical fiber, comprising a guide ferrule bush installed between the ferrule and the elastic member; and the guide ferrule bush and the optical fiber fusion splice part being integral by means of a reinforcing sleeve.

There is provided an optical fiber connector which fusion-splices a ferrule optical fiber enclosed in a ferrule elastically supported by means of an elastic member, and a main optical fiber by using a fusion splice unit, and the fusion splice part is reinforced by a reinforcing sleeve, thus connecting a main optical fiber and a ferrule optical fiber, comprising a guide ferrule bush installed between the ferrule and the elastic member; and the ferrule and the guide ferrule bush being movable within a range set by the elastic member.

There is provided an optical fiber connector which fusion-splices a ferrule optical fiber enclosed in a ferrule elastically supported by means of an elastic member, and a main optical fiber by using a fusion splice unit, and the fusion splice part is reinforced by a reinforcing sleeve, thus connecting a main optical fiber and a ferrule optical fiber, comprising a guide ferrule bush installed between the ferrule and the elastic member, the guide ferrule bush being elastically supported by means of the elastic member.

The ferrule and a ferrule optical fiber are supplied to a construction site in a ferrule assembly type that a coating of a ferrule optical fiber is not peeled, so the peeling of the same is conducted at a construction site.

A protrusion is formed at an end of the guide ferrule bush, and one end of the reinforcing sleeve surrounds the protrusion, so the ferrule, the guide ferrule bush and the reinforcing sleeve are integral.

There is provided an optical fiber connector which fusion-splices a ferrule optical fiber enclosed in a ferrule elastically supported by means of an elastic member, and a main optical fiber by using a fusion splice unit, and the fusion splice part is reinforced by a reinforcing sleeve, thus connecting a main optical fiber and a ferrule optical fiber, comprising the reinforcing sleeve being formed of a thermal contraction tube having a thermal adhering layer in the interior of the same.

There is provided a method for assembling an optical fiber connector which is fusion-spliced in such a manner that a ferrule optical fiber and another main optical fiber are fusion-spliced by using a fusion splice unit, comprising a step for engaging a ferrule assembly of a ferrule optical fiber the coating of which is not peeled off, at a holder; and a step for engaging the holder at the holder engaging part of the peeling device and performing a hot peeling procedure.

ADVANTAGEOUS EFFECTS

The optical fiber according to the present invention makes it possible to prevent a transformation of a ferrule by means of heat in such a manner that heat transferred to ferrule when heating a reinforcing sleeve is interrupted by a guide ferrule bush installed between a ferrule and an elastic member in such a manner that a ferrule and an elastic member do not contact with each other, so a hot peeling performed after heating is possible, thus preventing the damages of a ferrule which occurs due to a cold peeling.

In the conventional art, a ferrule optical fiber is peeled and then supplied in order to prevent a breaking of a boned portion between a ferrule body and a ferrule optical fiber occurring due to a cold peeling or a short circuit of a ferrule optical fiber, but when a peeled ferrule optical fiber is provided, it is exposed to the air for a long time, so the quality of the optical fiber changes, and it is hard to prevent the damages of a peeled optical fiber in the course of storage and movement. In the present invention, a hot peeling can be possible with the aid of a guide ferrule bush belonging to an optical fiber connector, so it does not need to supply a peeled ferrule optical fiber.

In addition, the guide ferrule bush is integrally formed with a reinforcing sleeve along with a ferrule bush, so it moves within a movement range of an elastic member, thus preventing a problem that a ferrule optical fiber is bent or becomes short circuit.

In the present invention, the reinforcing sleeve is formed of a thermal contraction tube with a thermal bonding layer in the interior in a single tube structure, so the storage and movement are easy, and the use of the same is convenient, and workability can be enhanced.

BRIEF DESCRIPTION OF THE DRAWINGS

The present invention will become better understood with reference to the accompanying drawings which are given only by way of illustration and thus are not limitative of the present invention, wherein;

FIGS. 18 and 19 are views of an operation that a ferrule optical fiber of a ferrule assembly is peeled by a hot (heating) peeling device installed at an optical fiber fusion splice unit used in an assembly of an optical fiber connector according to the present invention, of which FIG. 18 is a state that a holder with a ferrule assembly is mounted at a hot (heating) peeling device, and FIG. 19 is a state after a peeling by a peeling device;

Figure 1:
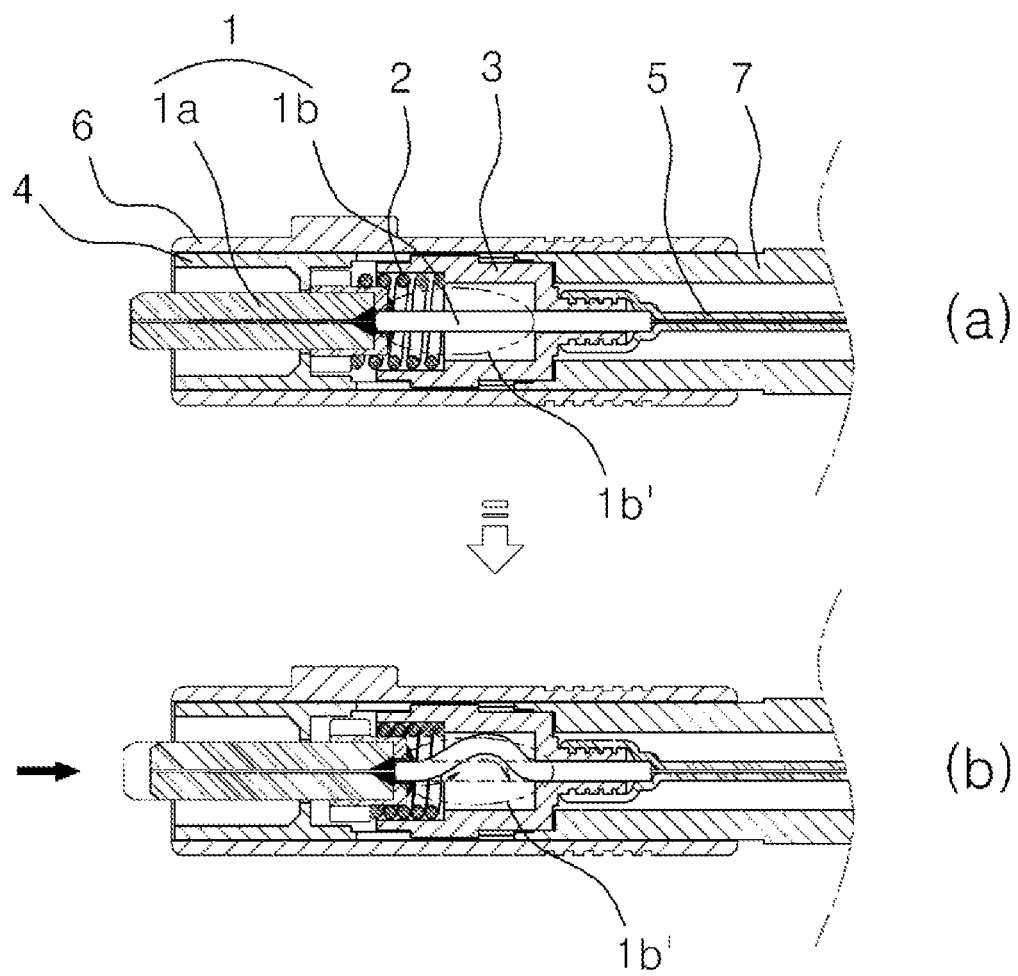
FIG. 1 is a cross sectional view of a partially assembled structure of a conventional optical fiber connector of which (a) is a cross sectional view of an to engaged state, and (b) is a cross sectional view of a phenomenon that part of a ferrule optical fiber is bent when external force is applied to a ferrule.
Figure 2:
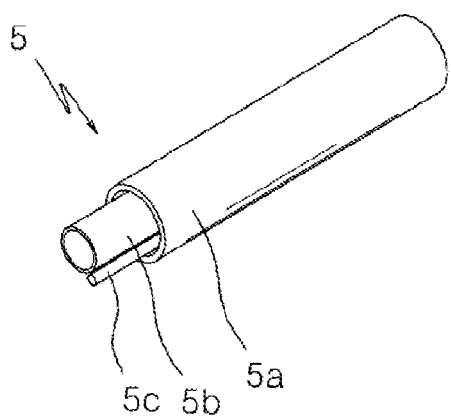
FIG. 2 is a view of a reinforcing sleeve of a conventional optical fiber connector of which (a) is a perspective view of the same, and (b) is a cross sectional view of the same.
Figure 2:
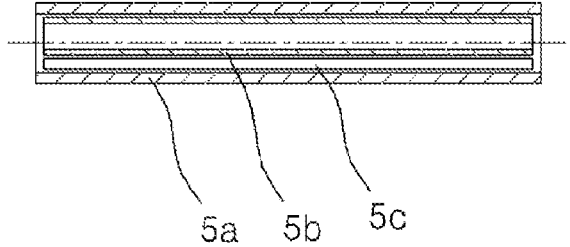

| - Descriptions of reference numerals - | |
|---|---|
| 10: ferrule | 11: ferrule body |
| 12: diameter expander | 13: ferrule optical fiber |
| 20: guide ferrule bush | 21: installation groove |
| 22: engaging shoulder | 23: guide part |
| 24: protrusion part | |
| 30: elastic member | |
| 40: plug frame | |
| 50: stopper | 52: guide hole |
| 60: reinforcing sleeve | 61: heat contraction tube |
| 62: heat bonding layer | |
| 70: connector grip | |
| 80: boot | 81: clamp device |
| 82: clamp part | 83: pressing ring |
| 90: main optical fiber | |
| a: ferrule assembly | C: optical fiber connector |
| 100: optical fiber fusion splice | |
| 110: peeling device | 120: cutting device |
| 130: fusion splice unit | 140: heating device |
| 150: monitor part | 160: end washing device |
| 170: holder | |

MODES FOR CARRYING OUT THE INVENTION

The preferred embodiments of the present invention will be described with reference to the accompanying drawings. The terms and words used in the descriptions and the claims are not intended to be interpreted as a conventional or limited meaning, and such terms and words should be preferably interpreted as having meaning and concepts matching with the technical concepts of the present invention based on the principles that the concepts of the words can be defined in a proper manner for the inventor to describe his own invention in the best mode.

Therefore, the embodiments and constructions of the descriptions of the present invention are for only illustrative purposes, not representing the technical concepts of the present invention, so it is obvious that there might be diverse equivalents and modifications which can substitute the inventions at the time of the application.

Figure 3:
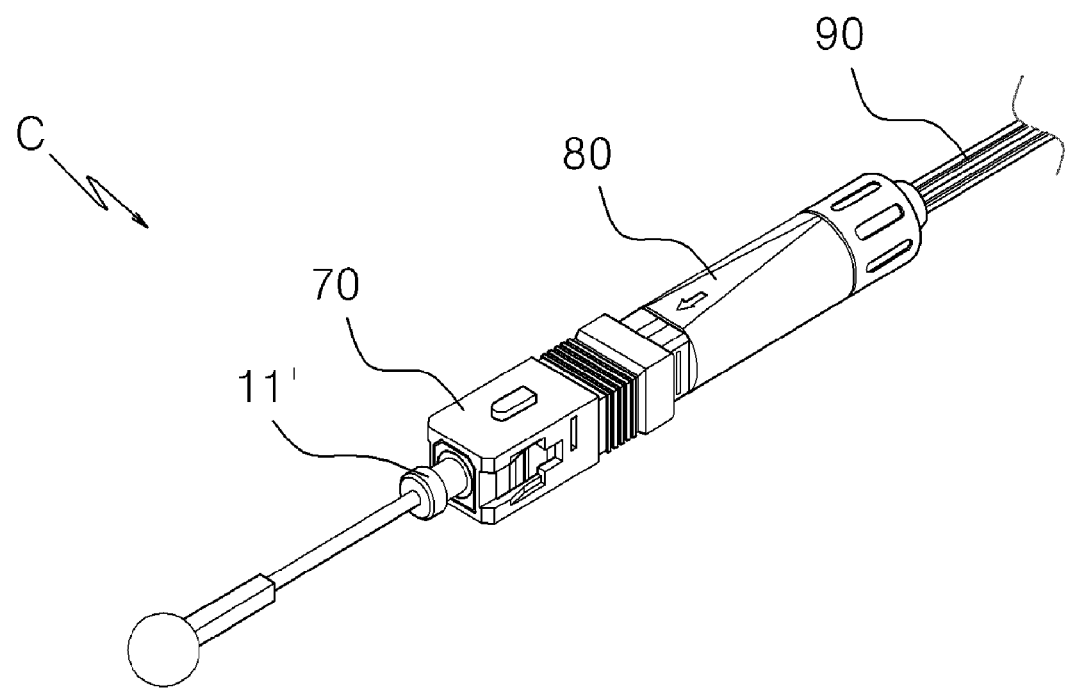
FIG. 3 is a perspective view of an optical fiber connector according to an embodiment of the present invention.
Figure 4:
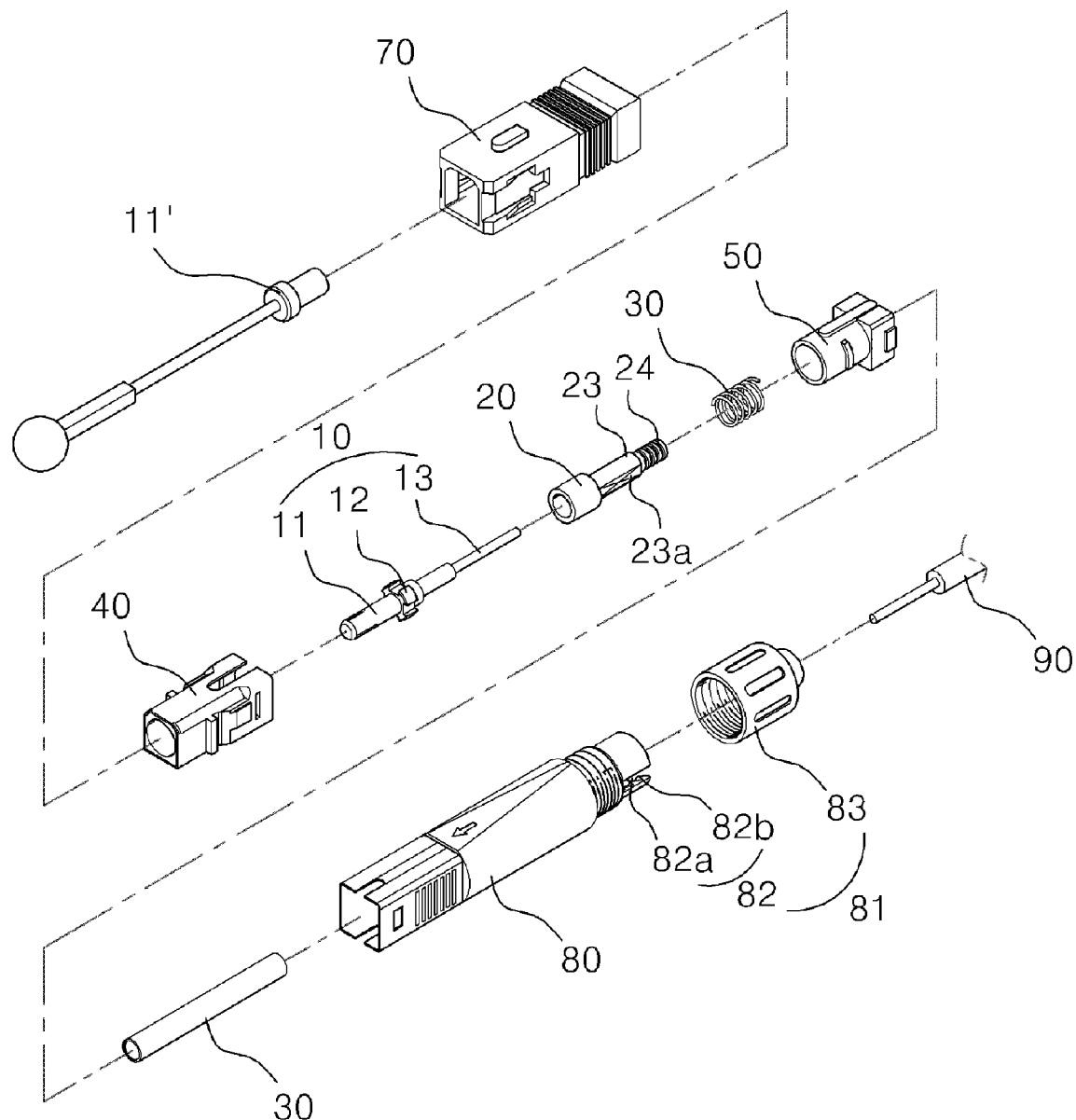
FIG. 4 is a disassembled perspective view of an optical fiber connector according to an embodiment of the present invention.
Figure 5:
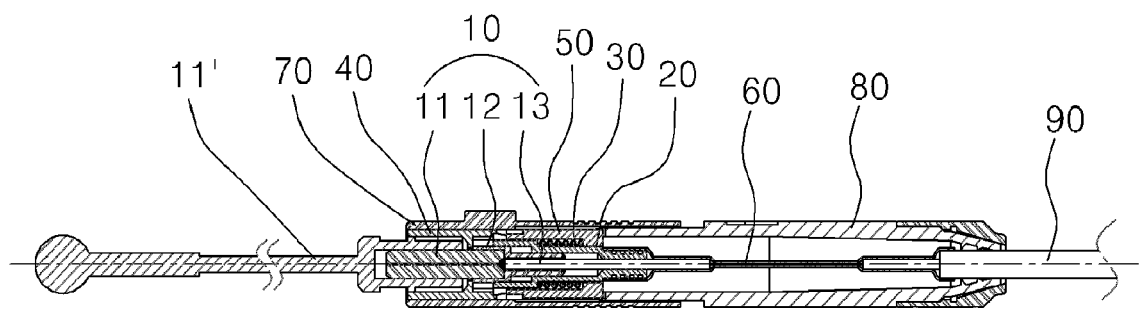
FIG. 5 is a cross sectional view of an assembled construction of an optical fiber connector according to an embodiment of the present invention.

As shown in FIGS. 3 to 5, the optical fiber connector C according to the present invention comprises a ferrule 10, a guide ferrule bush 20 enclosing part of the ferrule 10, an elastic member 30 installed at an outer side of the guide ferrule bush 20, a plug frame 40 enclosing the ferrule 10, the guide ferrule bush 20 and the elastic member 30, a stopper 50 which is engaged to the plug frame 40 and fixing the ferrule 10, the guide ferrule bush 20 and the elastic member 30 which are encased in the plug frame 40, a connector grip 70 enclosing the plug frame 40, a reinforcing sleeve 60 reinforcing the ferrule optical fiber 13 of the ferrule 10 and the fusion splice of the main optical fiber 90, and a boot 80 engaged to the stopper 50.

As shown in FIGS. 4 and 6 to 8, the ferrule 10 is formed of a ferrule body 11, a ferrule diameter expander 12, and a ferrule optical fiber 13. The ferrule body 11, the ferrule diameter expander 12 and the ferrule optical fiber 13 are bonded by an adhesive in an integral form, and the end of the ferrule optical fiber 13 is provided a non-peeled state and is peeled off using a peeling unit installed at a fusion splice unit at a construction site.

Figure 8:
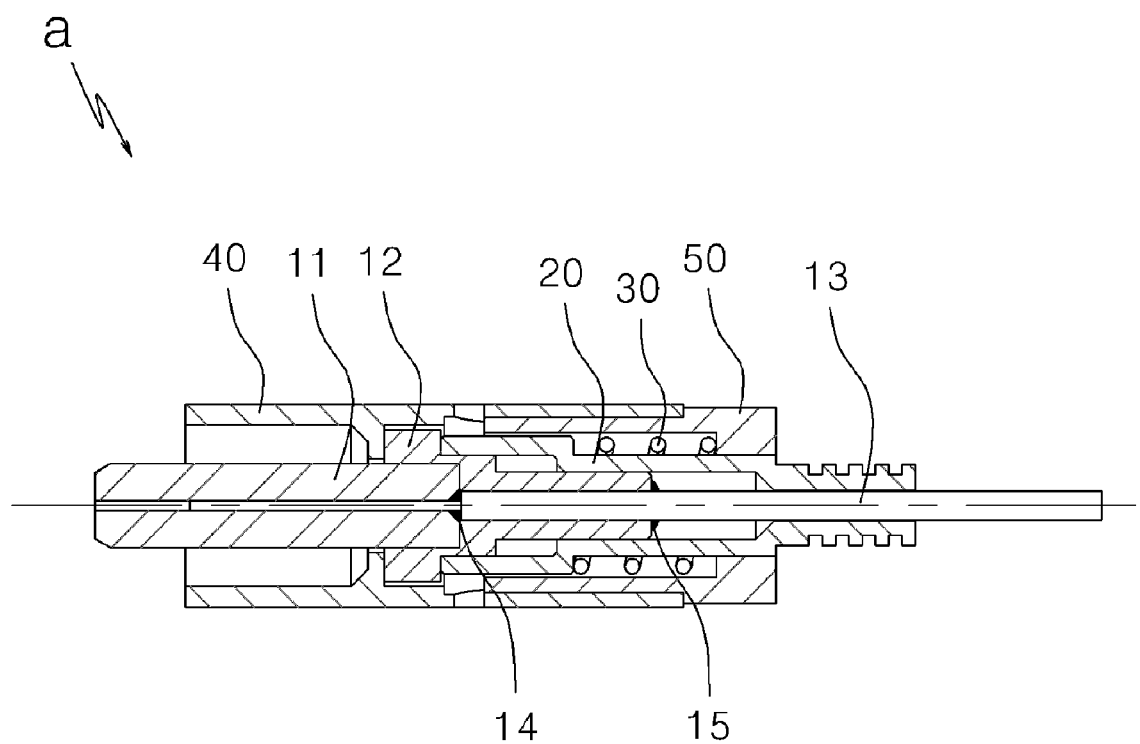
FIG. 8 is a cross sectional view of an assembled construction of a ferrule assembly which is part of the construction of an optical fiber connector according to an embodiment of the present invention.

As shown in FIG. 8, the ferrule 10 has first and second adhering parts 14 and 15 bonded by an adhesive, and the first adhering part 14 is integral with the ferrule body 11 and the ferrule optical fiber 13, and the second adhering part 15 is integral with the ferrule diameter expander 12 and the ferrule optical fiber 13.

As shown in FIG. 8, the first adhering part 14 is positioned at an inner side of the ferrule diameter expander 12, and the second adhering part 15 is positioned at the inner side of the guide ferrule bush 20. With the above construction, it is possible to prevent the head, which occurs when the ferrule optical ferrule 13 is peeled or the reinforcing sleeve is installed, from being transferred to the adhering parts 14 and 15.

Figure 6:
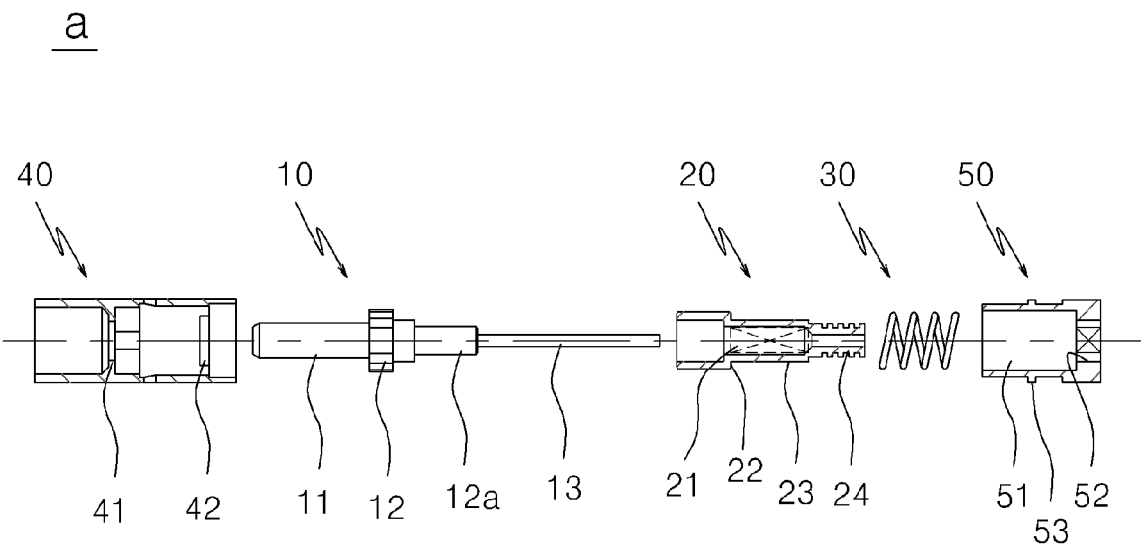
FIG. 6 is a cross sectional view of a disassembled construction of a ferrule assembly which is part of an optical fiber connector according to an embodiment of the present invention.

As shown in FIG. 6, the ferrule diameter expander 12 has a short shaft 12a, and the short shaft 12a is inserted into the installation groove 21 of the guide ferrule bush 20.

Reference numeral 11' represents a ferrule protection cap.

Figure 7:
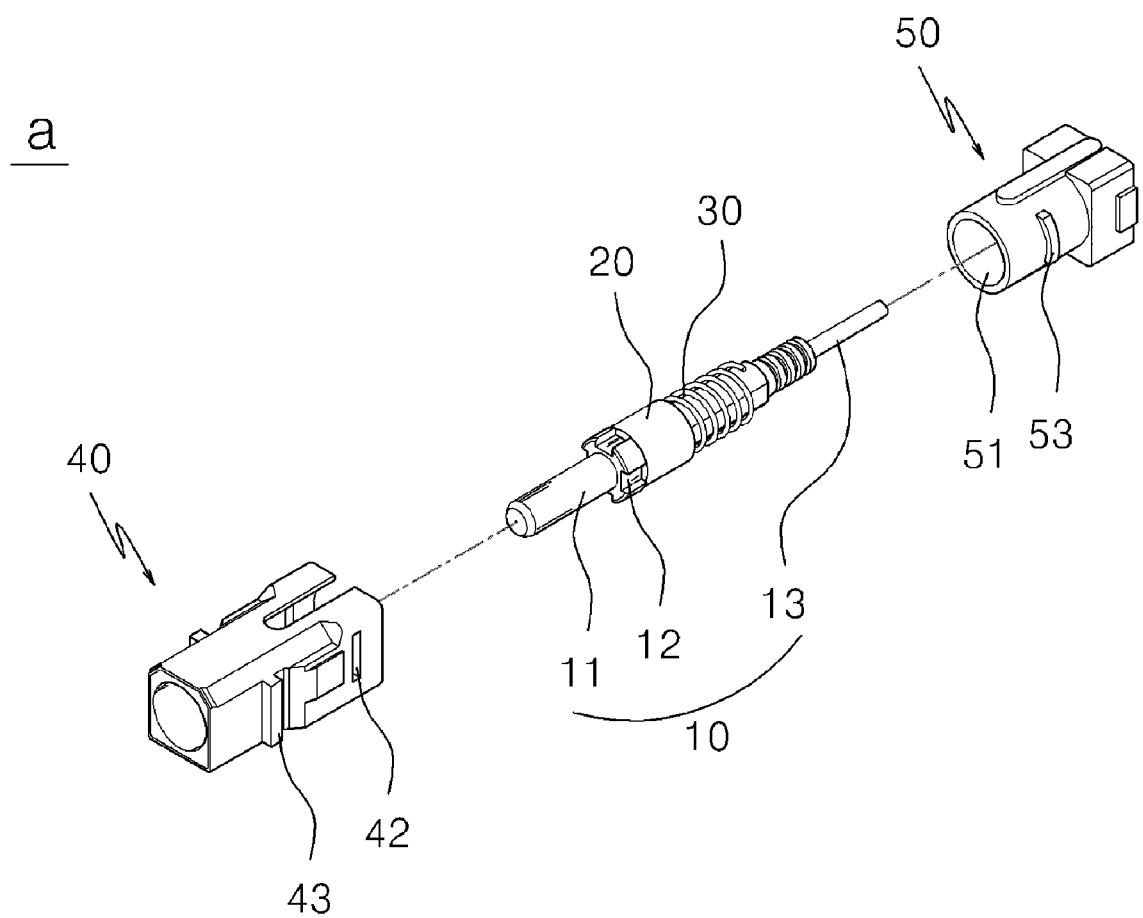
FIG. 7 is a disassembled perspective view of a ferrule assembly which is part of an optical fiber connector according to an embodiment of the present invention.
Figure 10:
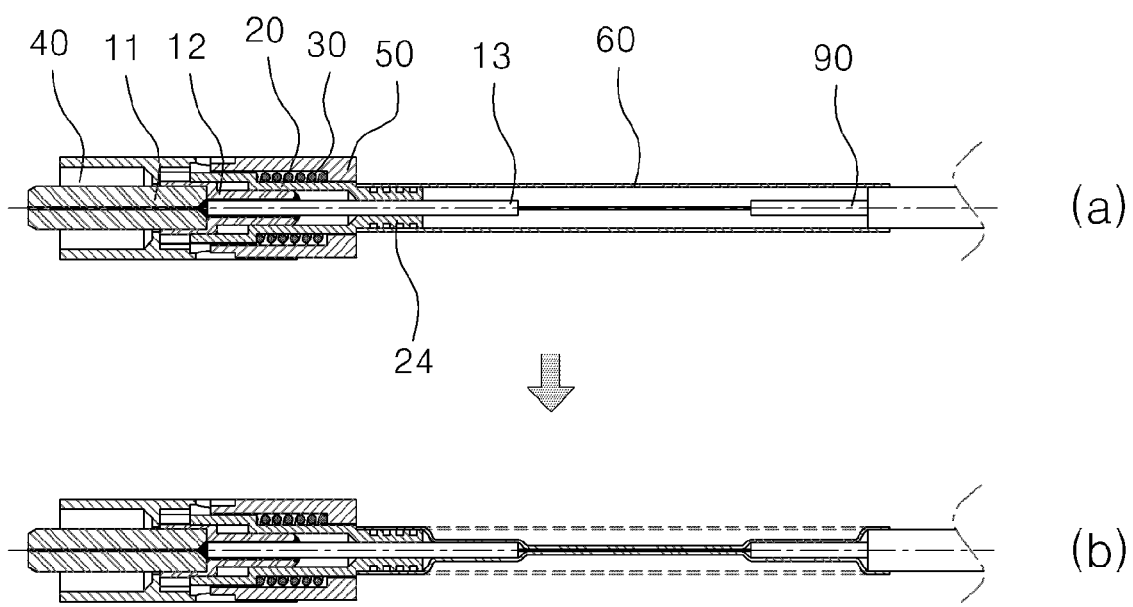
FIG. 10 is a cross sectional view of a partially assembled construction of an optical fiber connector according to an embodiment of the present invention, of which (a) is before a reinforcing sleeve is heated, and (b) is a cross sectional view after a reinforcing sleeve is heated.
Figure 11:
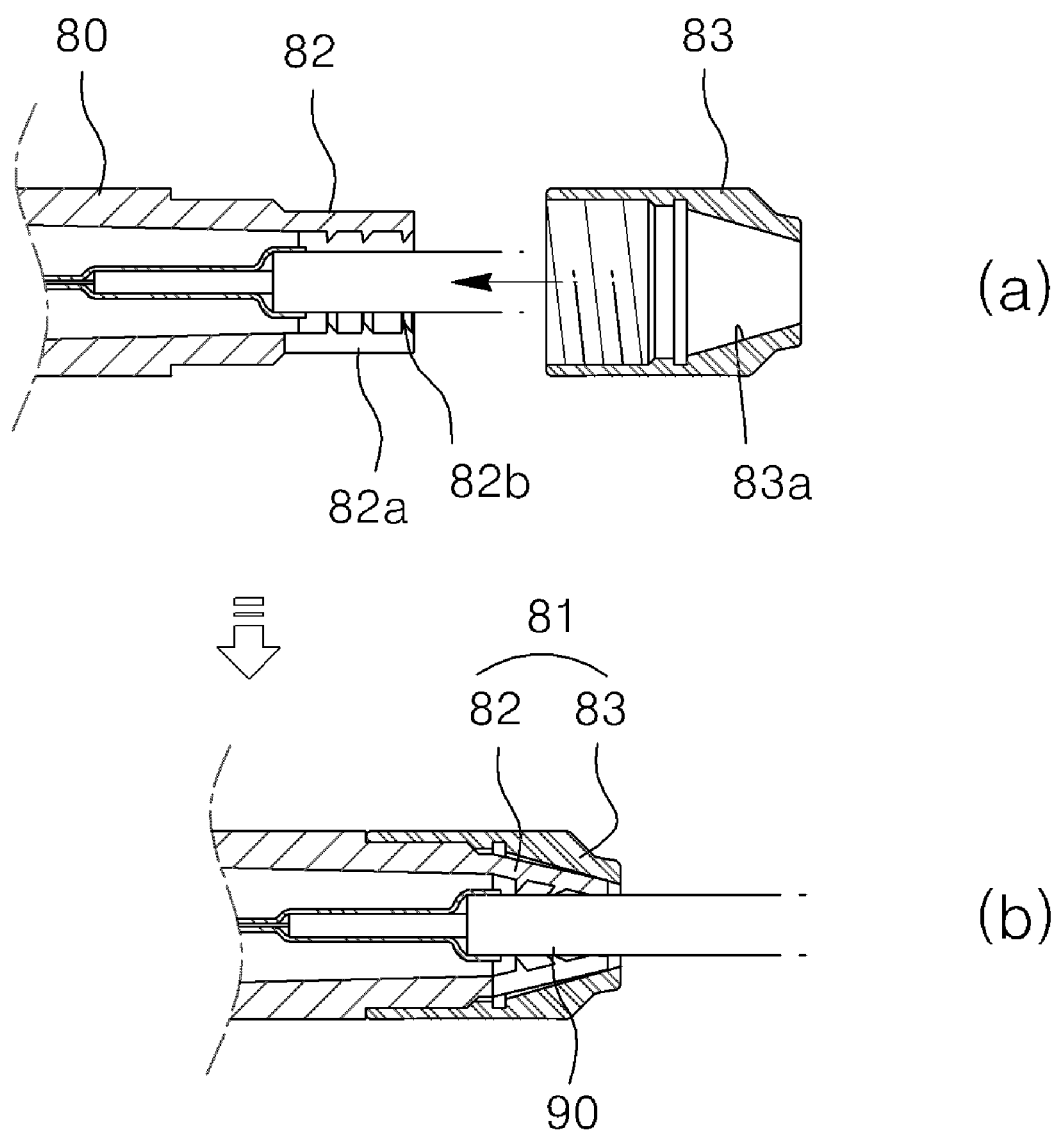
FIG. 11 is a detailed cross sectional view of a clamp apparatus of a boot of an optical fiber connector according to an embodiment of the present invention, of which (a) is before a pressing ring is engaged to a clamp part of a clamp device, and (b) is a cross sectional view after a pressing ring is engaged to a clamp part.

As shown in FIGS. 6 to 8, the guide ferrule bush 20 is formed in a tube type for the end of the ferule optical fiber 13 to pass through the same, and an installation groove 21 is formed at an inner side at a certain depth, so the short shaft 12a having the length same as the length of the ferrule diameter expander 12 can be inserted into, and the engaging shoulder 22 and the guide part 23 are installed at the outer side for the coil spring shaped elastic member 30 to be installed, and the protrusion part 24 is formed at the portion opposite to the opening into which the ferrule 10 is inserted. At least one plane surface is formed at the outer surface of the guide part 23 so that the guide ferrule bush 20 can move in the longitudinal direction of the ferrule optical fiber 13, but cannot rotate about the ferrule optical fiber 13. The plane surface comes into contact with the plane surface formed at the inner surface of the guide hole 52 of the stopper 50. As shown in FIG. 10, the protrusion part 24 is surrounded by the end of the reinforcing sleeve 60, so the guide ferrule bush 20 and the reinforcing sleeve 60 become integral.

The elastic member 30 is made of a metallic coil spring, and as shown in FIGS. 6 to 8, it is installed at the guide part 23 of the ferrule bush 20.

As shown in FIGS. 6 to 8, the plug frame 40 comprises a shoulder 41 which passes through and catches the ferrule diameter expander 12 of the ferrule 10 at the inner side, an engaging groove 42 for engagement with the stopper 50, and an engaging protrusion 43 for engagement with the connector grip 70 at an outer side.

As shown in FIGS. 6 to 8, the stopper 50 is engaged to the plug frame 40 as its one side is inserted into the plug frame 40 and fixes the ferrule 10 inserted in the plug frame 40 and has its other end engaged with the boot 80 and comprise an installation groove 51 formed at the inner side for the installations of the ferrule bush 20 and the elastic member 30, and a guide hole 52 installed for the guide part 23 of the guide ferrule bush 20 to pass through. At an inner surface of the guide hole 52 is formed a plane surface corresponding to the plane surface formed at the guide part 23 of the guide ferrule bush 20, the plane surface coming into contact with the plane surface formed at the guide part 23 of the guide ferrule bush 20, thus allowing the guide ferrule bush 20 to move in the longitudinal direction of the ferrule optical fiber 13, not permitting rotating about the ferrule optical fiber 13. At the outer side is formed an engaging protrusion 53 for engagement with the plug frame 40.

Figure 9:
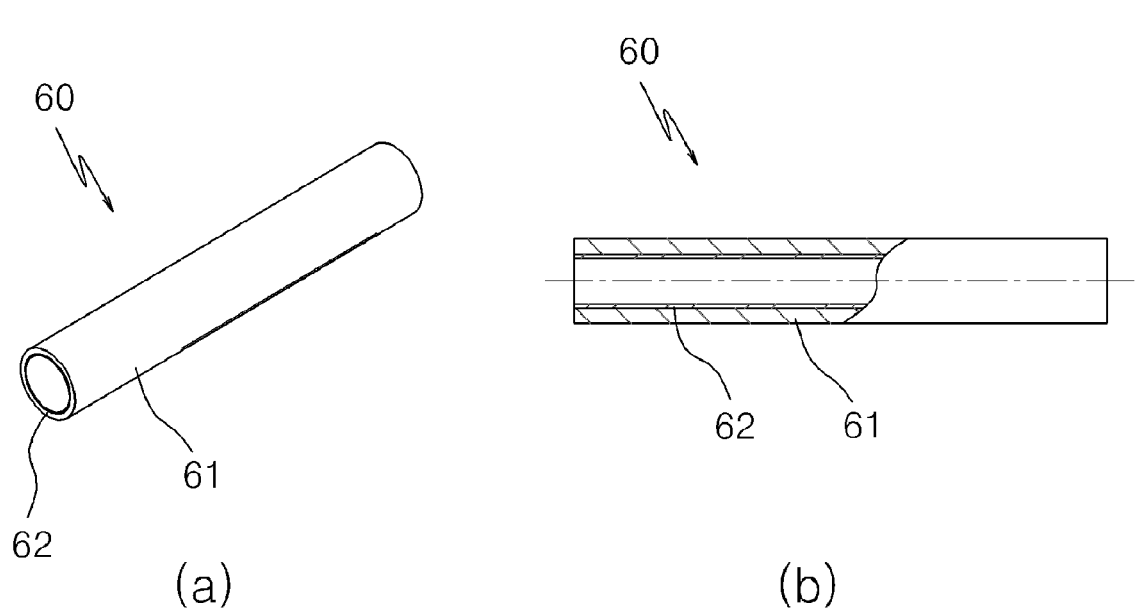
FIG. 9 is a view of a reinforcing sleeve of an optical fiber connector according to an embodiment of the present invention, of which (a) is a perspective view, and (b) is a cross sectional view.

As shown in FIGS. 9 and 10, the reinforcing sleeve 60 is directed to surrounding the fusion splice part connected with the ferrule optical fiber 13 and the main optical fiber 90, thus reinforcing the same. The reinforcing sleeve 60 is formed in a single tube structure formed of a thermal contraction tube 61, and a thermal adhering layer 62 formed at an inner side of the heat contraction tube 61 by means of a thermal adhesive like a hot melt. The reinforcing sleeve 60 might include an elongated reinforcing pin which can bend with an elastic property.

The single tube shaped reinforcing sleeve 60 in which the thermal adhering layer 62 is formed at its inner side makes it possible to seal the fusion splice parts of the ferrule optical fiber 13 and the main optical fiber 90 by means of the thermal adhering layer 62 during heating.

Even though the metallic reinforcing pin used in the conventional reinforcing sleeve is removed, a bending at the portion of the reinforcing sleeve 60 can be obtained. As shown in FIG. 12B, when an external force is applied in the direction of the ferrule 10, the ferrule 10 and the guide ferrule bush 20 integrally move with a moving range permitted by the elastic member 30 and bend at the portion of the reinforcing sleeve 60.

Instead of using the metallic reinforcing pin which is conventionally used to prevent bending, an elongated reinforcing pin which can bend with an elastic force can be used. Namely, the elongated reinforcing pin should be elastically bent without having a transformation in a longitudinal direction, thus providing a bending of an optical fiber in the reinforcing sleeve, not allowing a transformation in a longitudinal direction.

When it is bent at the portion of the reinforcing sleeve 60, it is possible to prevent the reinforcing pin from being sharply bent since it is longer than the ferrule optical fiber 13 in the plug frame 40.

The boot 80 is engaged with the stopper 50 and surrounds the portions of the reinforcing sleeve 60. As shown in FIGS.

4 and 11, the boot 80 has an engaging groove to be engaged with the engaging protrusion of the stopper 50 at an outer side. At an end of the same (where the main optical fiber is inserted) is formed a clamp device 81 for preventing the force, applied in the direction of the main optical fiber 90, from being transferred in the direction of the ferrule 10 by clamping the main optical fiber 90.

The clamping device 81 comprises a clamp part 82 formed at an end of the boot body with the diameter of the clamp part changing when an external force is applied, and a pressing ring 83 installed at an outer side of the clamp part 82 for thereby applying an external force so that the diameter of the clamp part 82 changes.

The clamp part 82 is formed of at least one cut-away part 82a at an end portion so that the diameter of the same can change when an external force is applied, and a clamp protrusion 82b is formed at an inner side for enhancing a clamping force.

The pressing ring 83 has a taper (slope surface) 83a at its inner surface for applying an external force thus changing the diameter of the clamp part 82.

At an outer surface of the clamp part 82 is formed a male thread groove, and at an inner surface of the pressing ring 83 is formed a thread groove, so the clamp part 82 and the pressing ring 83 are thread engaged with each other.

Figure 13:
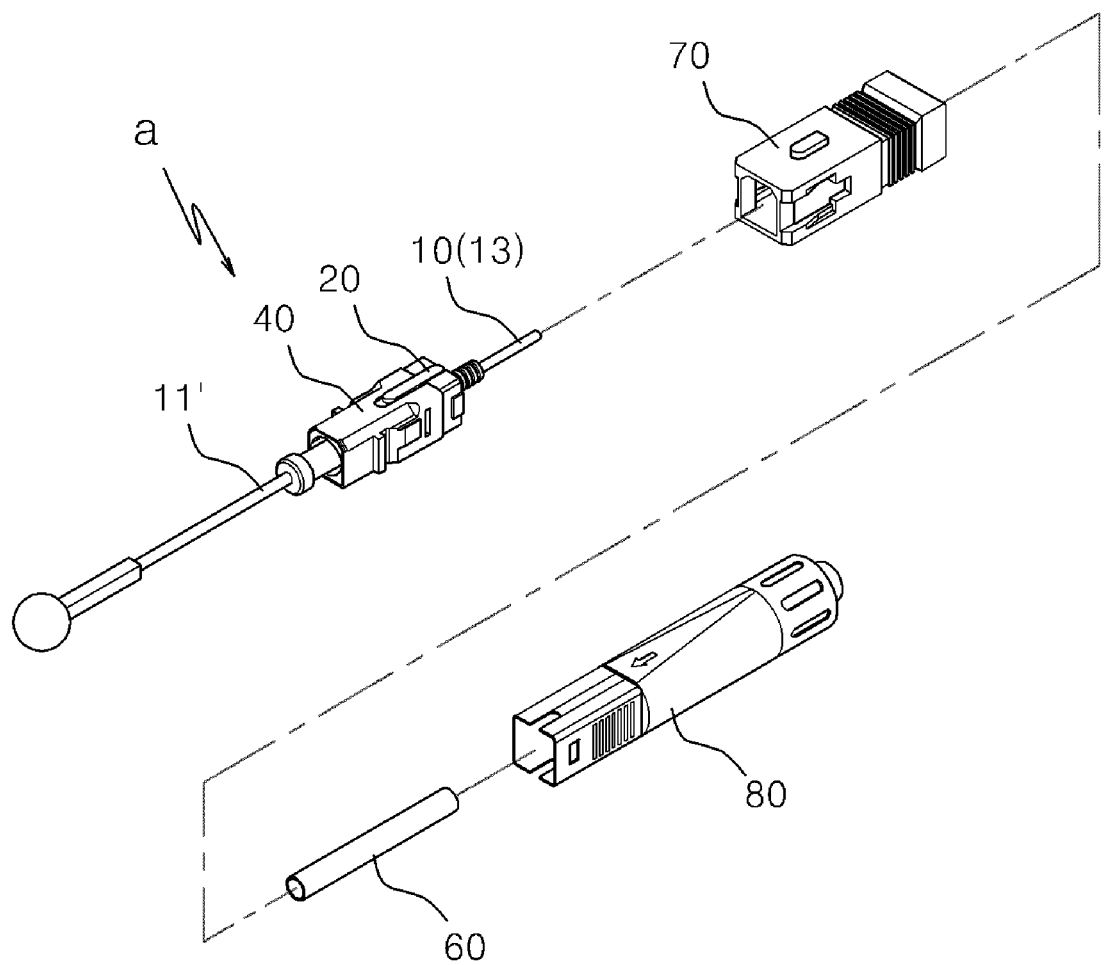
FIG. 13 is a perspective view of a partial assembly of an optical fiber connector according to an embodiment of the present invention.

As shown in FIG. 13, it is preferred that a ferrule assembly (a), a connector grip 70, a reinforcing sleeve 60 and a boot 80 keep separated from one another when they are supplied, thus forming an optical fiber connector C.

As shown in FIGS. 6 to 8, the ferrule assembly (a) is formed in an integral structure formed of a ferrule 10 having a ferrule optical fiber 13 the end of which is not peeled, and a guide ferrule bush 20, an elastic member 30, a plug frame 40, and a fixture 50.

As they are supplied in the form of the ferrule assembly (a), the worker can peel the end of the ferrule optical fiber 13 by using a fusion splice unit at the construction site, while preventing the losses of the small elastic member 30, the fixture 50 or other elements.

Figure 14:
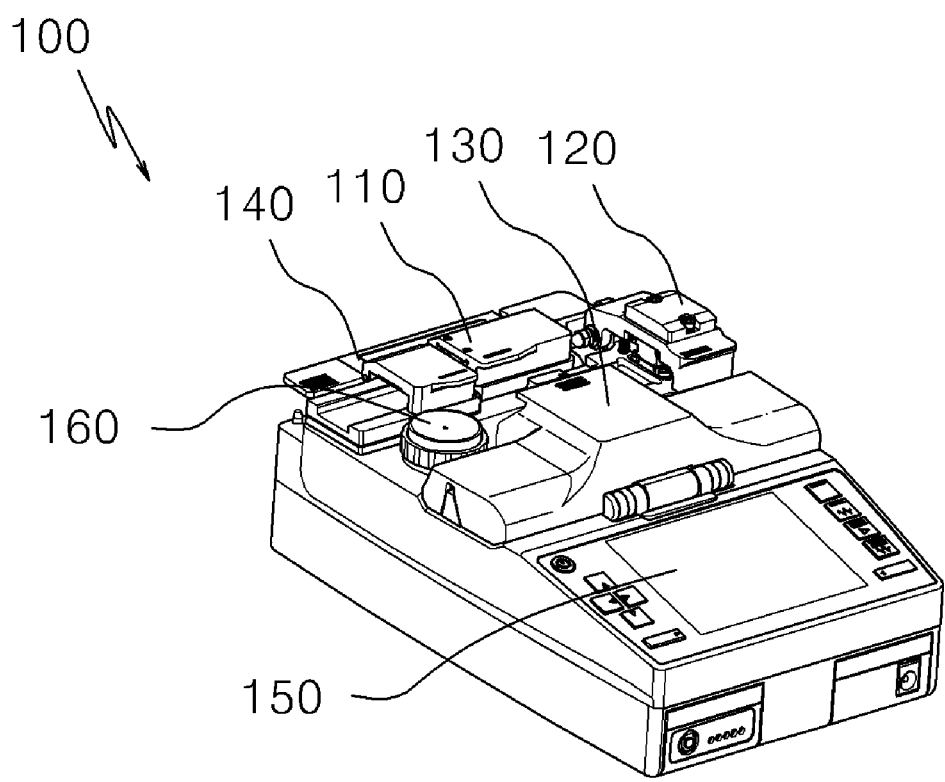
FIGS. 14 and 15 are perspective views of an optical fiber fusion splice unit used for an assembly of an optical fiber connector according to the present invention.
Figure 15:
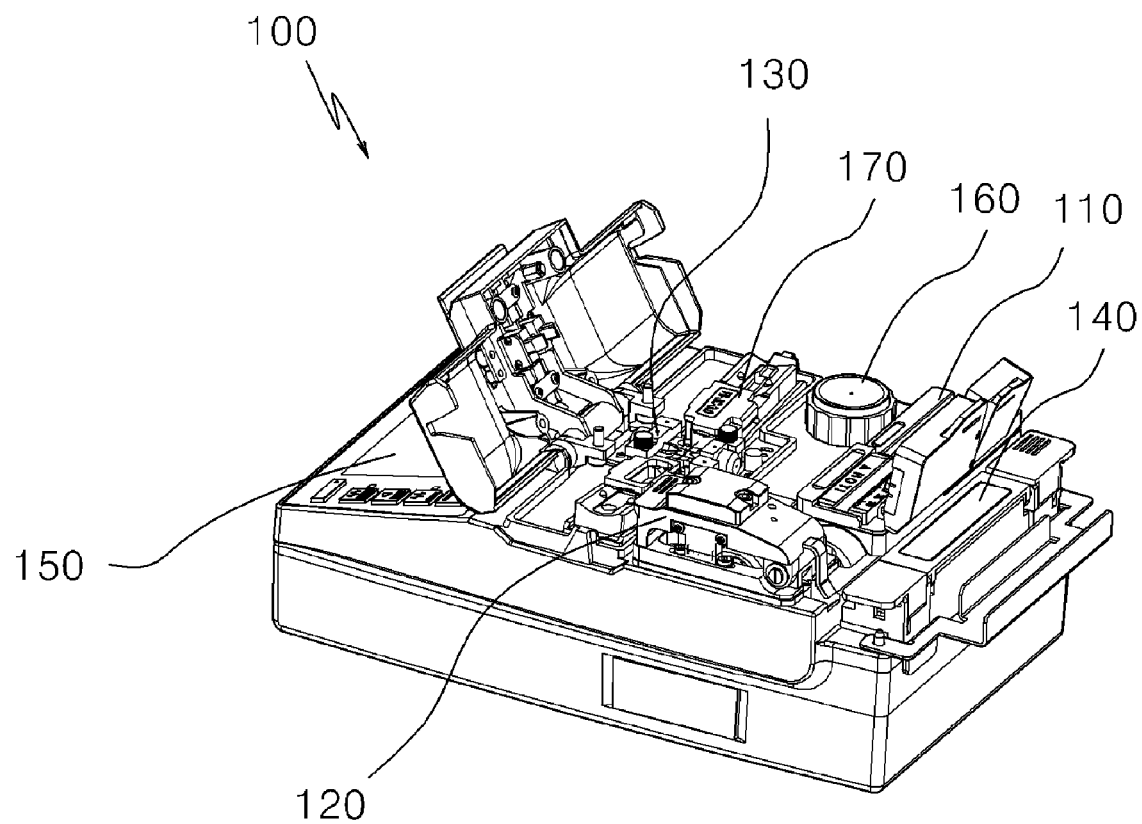

FIGS. 14 and 15 show the optical fiber fusion splice 100. The optical fiber fusion splice 100 comprises a peeling device 110 for peeling the optical fiber, a cutting device 120 for cutting an end of the optical fiber peeled by the peeling device 110, a fusion splice unit 130 for fusion splicing the core ends of the ferrule optical fiber 13 cut by the cutting device 120 and the main optical fiber 90, a heating device 140 for reinforcing the fusion splice part fusion-spliced by the fusion splice device 130 with the reinforcing sleeve, a monitor part 150, a washing device 160 washing the optical fiber ends cut by the cutting device 120, and a holder 170 which encloses the ferrule assembly (a) and installs the peeling device 110 or the fusion splice device 130.

The technology concerning the optical fiber fusion splice unit 100 is provided in various forms. The same applicant of the present invention has filed a Korean patent registration number 10-0951427 entitled a portable optical fiber fusion splice unit.

Figure 17:
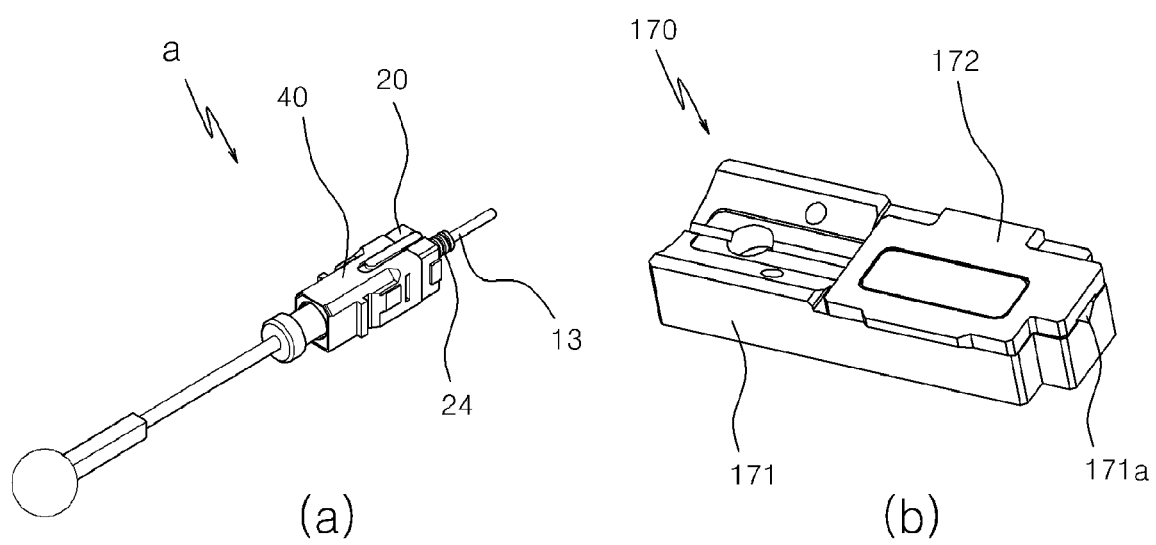
FIG. 17 is a perspective view of a ferrule assembly of an optical fiber connector and a holder in which the ferrule assembly is installed according to the present invention, of which (a) is a ferrule assembly, and (b) is a holder.

As shown in FIG. 17, the ferrule assembly (a) integrally formed of a ferrule 10 in which a ferrule optical fiber 13 is installed, a guide ferrule bush 20, an elastic member 30, a plug frame 40, and a fixture 50, is enclosed in a holder 170 formed of a holder body 171 having a V-shaped groove 171a for fixing a ferrule optical fiber 13 and a cover 172, and the holder 170 is detachably fixed at the peeling device 110 and the fusion splice unit 130, respectively.

Figure 16:
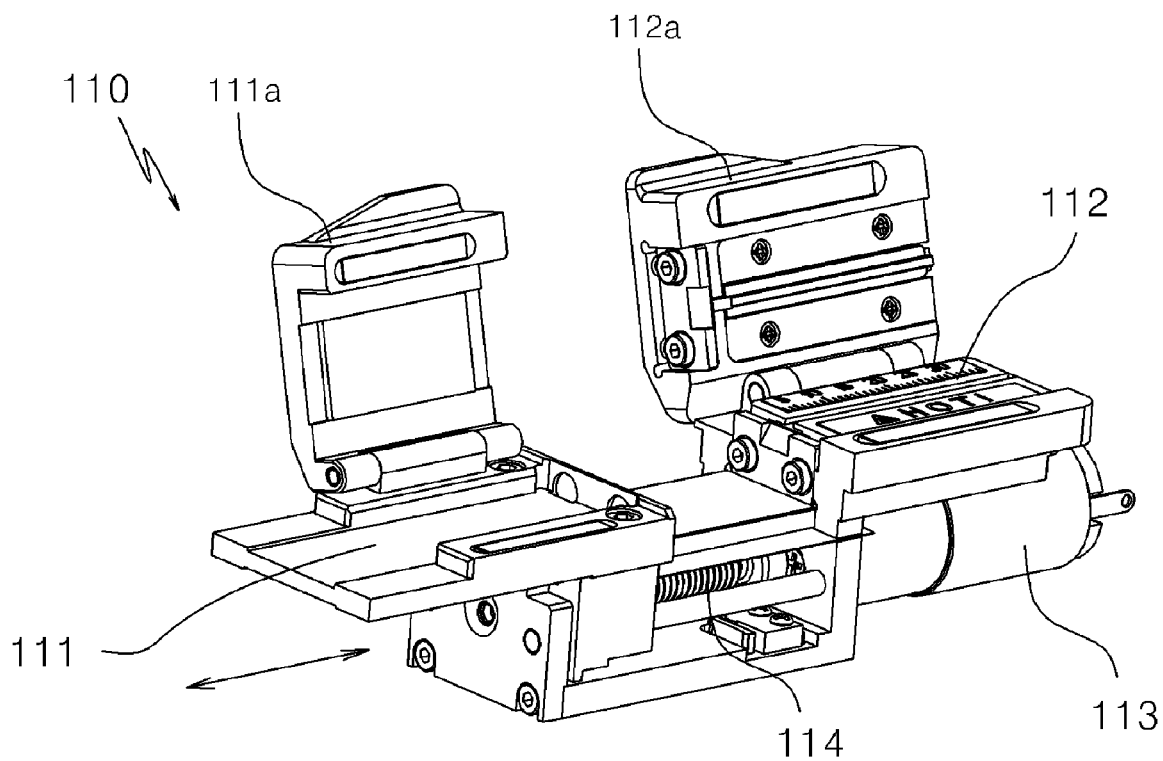
FIG. 16 is a perspective view of a hot (heating) peeling device installed at an optical fiber fusion splice unit used in an assembly of an optical fiber connector according to the present invention.

As shown in FIGS. 15 and 16, an installation part is provided at the portions of the peeling device 110 and the fusion splice device 130 for enclosing the ferrule assembly (a) that is to detach the holder (170).

Figure 18:
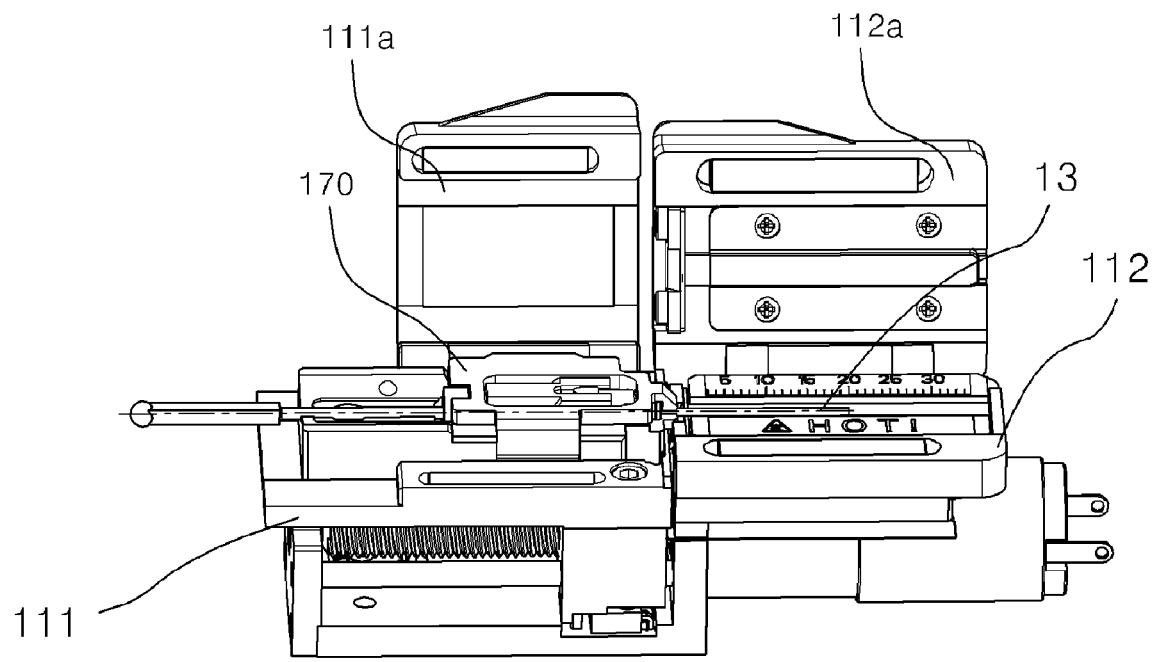

As shown in FIGS. 16 to 18, the peeling device 110 comprises a slide part 111 in which the holder 170 having a ferrule assembly (a) is enclosed and which slides, a heating peeling part 112 for peeling the ferrule optical fiber 13 of the ferrule assembly (a), and a transfer motor 113 having a transfer shaft 114 for reciprocating the slide part 111.

At each of the slide part 111 and the heating peeling part 112 are disposed at covers 111a and 112a, respectively.

Figure 19:
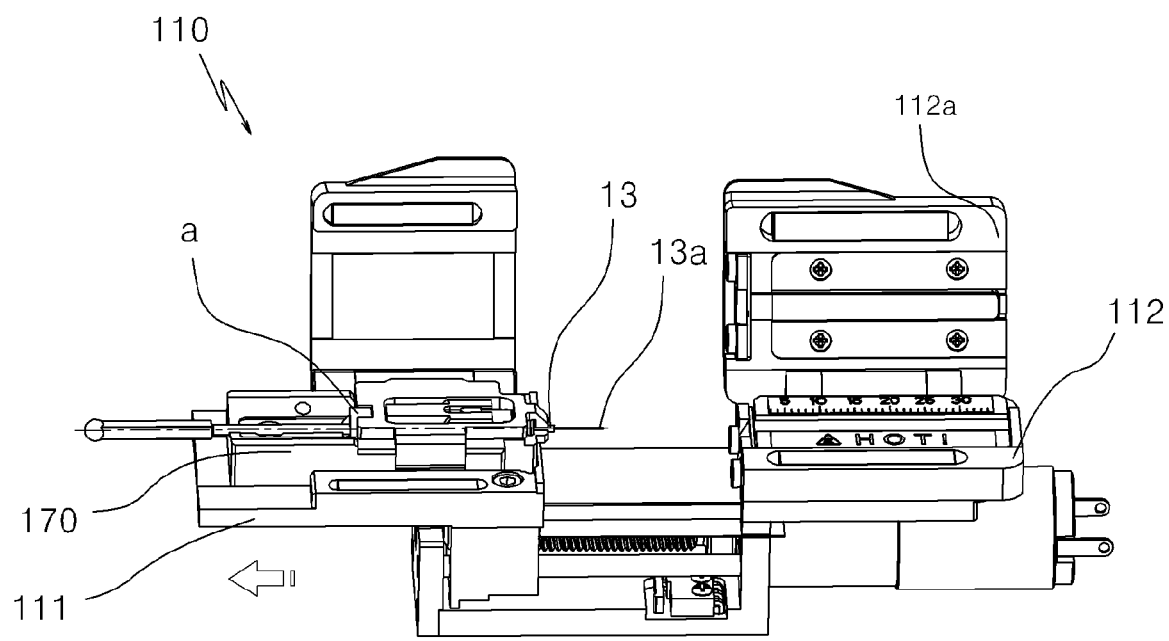
Figure 20:
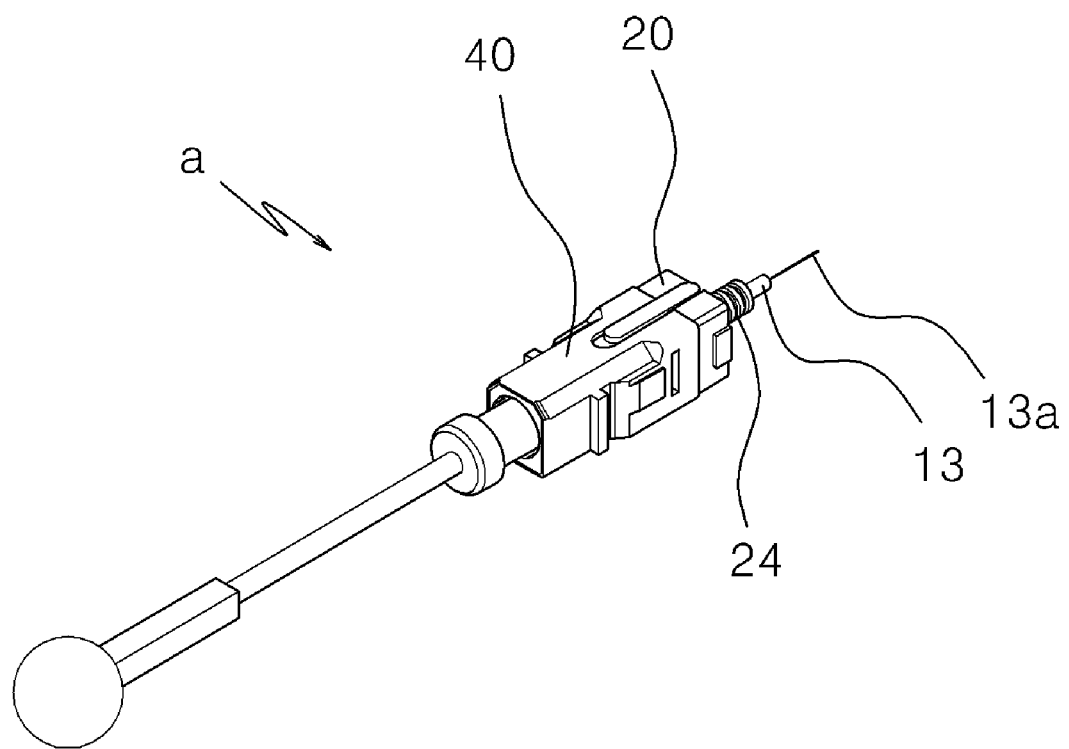
FIG. 20 is a perspective view of a state that an end of a ferrule optical fiber is peeled in a ferrule assembly of an optical fiber connector according to the present invention.

As shown in FIG. 19, the holder 170 having the ferrule assembly (a) is installed at the slide part 111 of the peeling device 110, and the covers 111a and 112a are covered, and the heating peeling part 112 is heated, and the transfer motor 113 is driven, and the slide part 111 is moved. As a result, as shown in FIG. 19, the end of the fiber is peeled so that the core 13a of the ferrule optical fiber 13 of the ferrule assembly (a) enclosed in the holder 170 is exposed.

The core 13a of the ferrule optical fiber 13 of the ferrule assembly (a) which was peeled, is cut by the cutting device 120, and then is washed by means of the washing device 160 and is fusion-spliced with the main optical fiber 90 at the fusion splice device 130.

The peeling work for peeling the end of the optical fiber is classified into a cold (lot temperature) peeling performed without heating, and a hot (heating) peeling performed by heating.

First, the cold (low temperature) peeling is directed to peeling at a room temperature without heating, which has a disadvantage that large load (weight) is applied to the optical fiber during peeling. Namely, the ferrule diameter expander 12 and the adhering parts 14 and 15 of the ferrule optical fiber 13 might be damaged by the force during peeling, or the ferrule optical fiber 13 might be disconnected (short circuit).

Second, the hot (heating) peeling is directed to peeling by heating, which has an advantage that force (weight) is less applied to the optical fiber, but the ferrule diameter expander 12 and adhering parts 14 and 15 of the ferrule optical fiber 13 might be melted down by means of the heat.

As shown in FIG. 8, in the present invention, the guide ferrule bush 20 surrounds the ferrule diameter expander 12 and the adhering parts 14 and 15 of the ferrule optical fiber 13 and is spaced-apart from the adhering parts 14 and 15 and the protrusions 24 of the guide ferrule bush 20, and the guide ferrule bush 20 insulates the heat transferred to the adhering parts 14 and 15 during heating for a hot (heating) peeling, so that it is possible to prevent the transforms of the adhering parts 14 and 15 due to the heat.

In case of peeling, the ferrule assembly (a) is installed at the holder 170, and a necessary work is performed, and at this time, the ferrule optical fiber 13 is clamped by means of the V-shaped groove 171a formed at the holder body 171 and the cover 172, so that the weight occurring during the peeling is not transferred to the adhering parts 14 and 15, thus preventing transformation and short circuits.

The optical fiber connector C according to the present invention has a hot peeling during the peeling work of the ferrule optical fiber 13, so it does not need to supply in a peeled state of the ferrule optical fiber 13, namely, the peeling is possible at the construction site.

Figure 21:
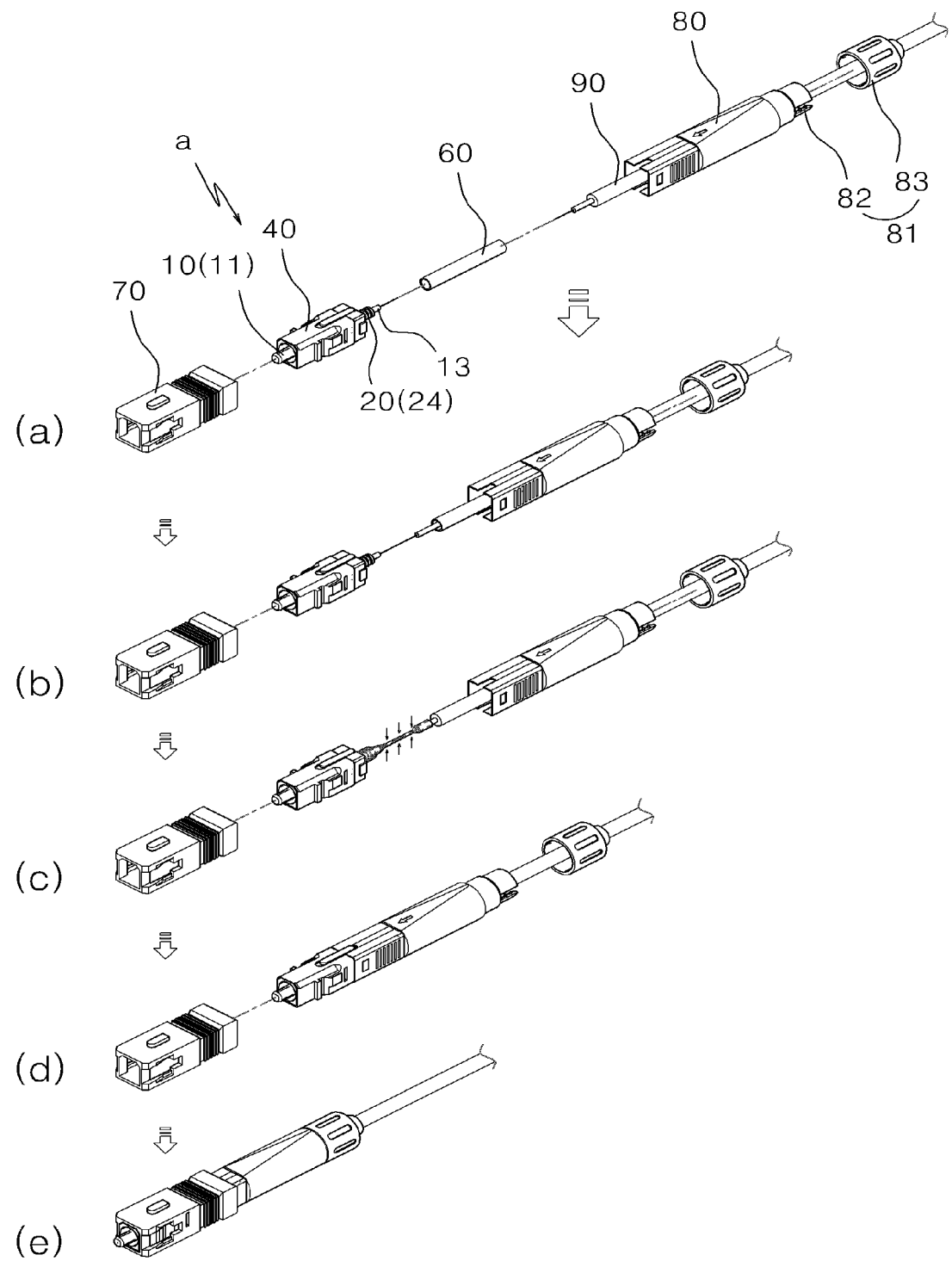
FIG. 21 is a flow chart of an assembling procedure of an optical fiber connector of an embodiment of the present invention.

FIG. 21 is a view of an assembling procedure of the optical fiber connector C in a state that the peeling work, the cutting work and the washing work with respect to the end of the ferrule optical fiber 13 of the ferrule assembly (a) are all finished, but some of the procedures might be changed in their sequences.

As shown in FIG. 21A, the end of the ferrule optical fiber 13 of the ferrule assembly (a) and the end of the main optical fiber 90 are processed, at the construction site, with the peeling, cutting and washing works by using the peeling device 110 of the optical fiber fusion splice unit 100, the cutting device 120 and the washing device 160.

As shown in FIG. 21B, the cores of the ends of the ferrule optical fiber 13 and the main optical fiber 90 having finished the peeling, cutting and washing processes are arranged to be opposite to each other, and the cores are processed with the fusion splice procedures by using the fusion splice device 130 of the fusion splice unit 100, thus fusion-splicing the ferrule optical fiber 13 and the main optical fiber 90.

As shown in FIG. 21C, a reinforcing sleeve 60 is disposed at the ferrule optical fiber 13 and the fusion splice portion of the main optical fiber 90, and the thermal contraction procedure is performed using the heating device 140 of the fusion splice unit 100, and then the reinforcing sleeve 60 is installed at the fusion splice portion of the ferrule optical fiber 13 and the main optical fiber 90.

As shown in FIG. 10, one end of the reinforcing sleeve 60 installed at the fusion splice portion surrounds the protrusion 24 of the guide ferrule bus 20, and the other end of the same surround an outer coating of the main optical fiber 90, thus heating and contracting.

Figure 12:
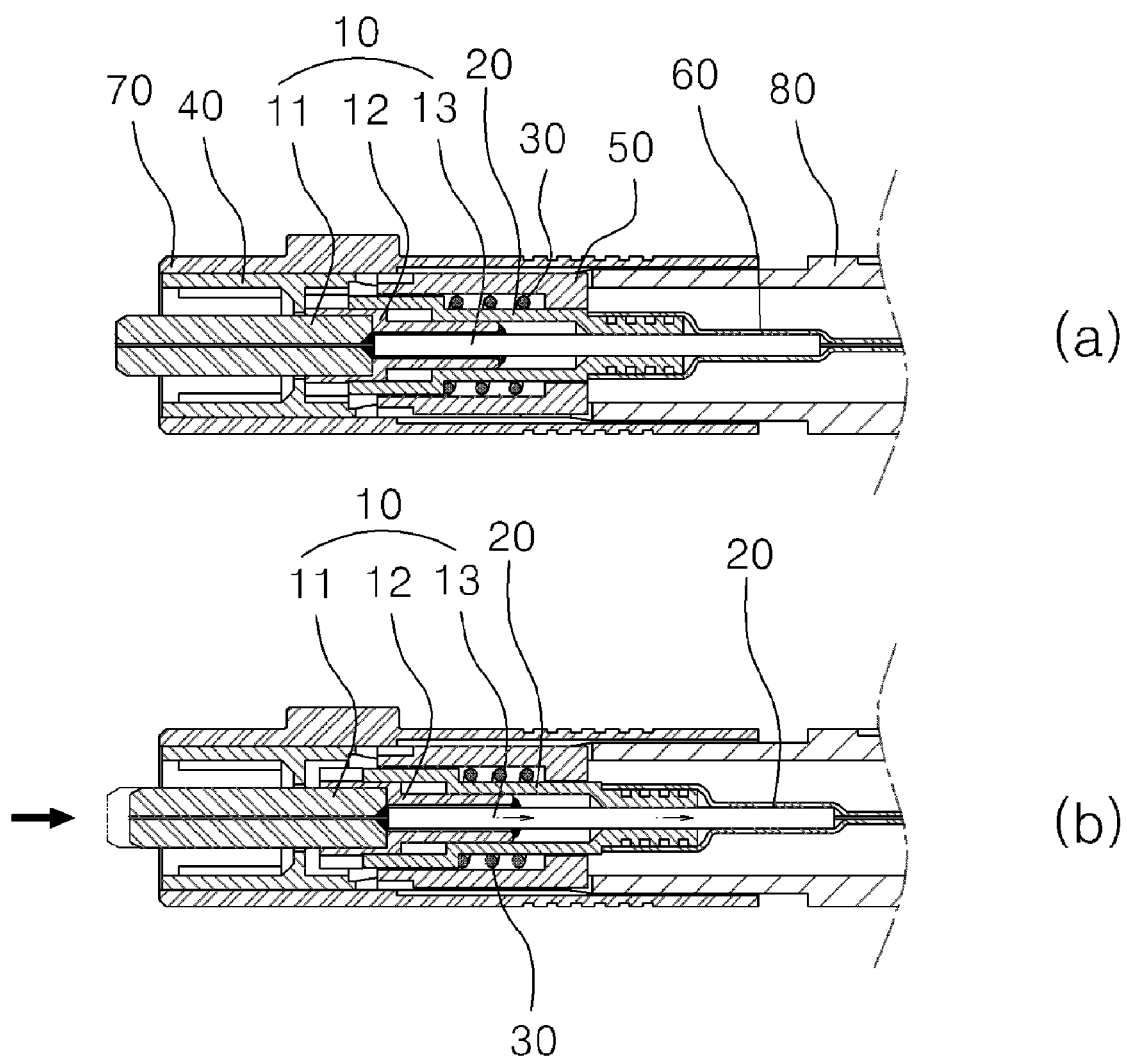
FIG. 12 is a cross sectional view of a partial assembly of an optical fiber connector according to an embodiment of the present invention, of which (a) is a cross sectional view of an engaged state, and (b) is a cross sectional view of a state that a part of a ferrule optical fiber is bend as a ferrule and a guide ferrule bush move together when an external force is applied to a ferrule.

As shown in FIG. 12, the ferrule 10 moves within a range permitted by the elastic member 30, and as shown in FIG. 12B, while the ferrule 10 is being moved, the guide ferrule bush 20 moves together, so it is possible to prevent the bending of the ferrule optical fiber 13.

The ferrule optical fiber 13, the guide ferrule bush 20 and the reinforcing sleeve 60 become integral by means of the reinforcing sleeve 60. While the ferrule 10 is being moved, the bending of the ferrule optical fiber 13 positioned in the guide ferrule bush 20 can be prevented.

As shown in FIG. 21D, the ferrule assembly (a) and the boot 80 are engaged, and the main optical fiber 90 is clamped by means of the boot 80 by using the clamp device 81 installed at the boot 80.

As shown in FIG. 21E, the assembly of the ferrule assembly (a) and the boot 80 is engaged with the connector grip 70, thus assembling the optical fiber connector C.

The invention claimed is:

1. An optical fiber connector, comprising:
a ferrule optical fiber enclosed in a ferrule, the ferrule being elastically supported by an elastic member; and
a main optical fiber,
wherein one end of the ferrule is configured to pass through a guide ferrule bush so that the guide ferrule bush encloses a part of the ferrule,
wherein the ferrule optical fiber and the main optical fiber are fusion-spliced by a fusion splice unit, which comprises a fusion splice part, and
wherein the fusion splice part is reinforced by a reinforcing sleeve wherein the ferrule optical fiber, the guide ferrule bush, and the fusion splice part are integral by the reinforcing sleeve.

2. The optical fiber connector according to claim 1, wherein a protrusion is formed at an end of the guide ferrule bush, and one end of the reinforcing sleeve surrounds the protrusion, so that the ferrule, the guide ferrule bush and the reinforcing sleeve are integral.

3. The optical fiber connector according to claim 1, wherein said reinforcing sleeve is formed of a thermal contraction tube having a thermal adhering layer in the interior of the same.

4. The optical fiber connector of claim 1, wherein a clamping device is installed at an end of a boot positioned at an outer side of the reinforcing sleeve of the optical fiber connector for clamping with respect to the main optical fiber, and said clamping device comprises a clamp part having a clamping protrusion on an inner surface the diameter of which changes with respect to an external force, and a pressing ring which is installed at an outer side of the clamp part and has a taper at an inner surface of the pressing ring for applying an external force to the clamp part.

5. The optical fiber connector of claim 1, wherein said guide ferrule bush is inserted into a plug frame and is fixed by a stopper, and said the guide ferrule bush is movable in a longitudinal direction of the optical fiber, and the rotation in the axial direction of the optical fiber is fixed.

6. An optical fiber connector, comprising:
a ferrule optical fiber enclosed in a ferrule, the ferrule being elastically supported by an elastic member; and
a main optical fiber,
wherein one end of the ferrule is configured to pass through a guide ferrule bush so that the guide ferrule bush encloses a part of the ferrule,
wherein the ferrule optical fiber and the main optical fiber are fusion-spliced by a fusion splice unit, which comprises a fusion splice part, and
wherein the fusion splice part is reinforced by a reinforcing sleeve wherein the ferrule and the guide ferrule bush are configured to move together within a range set by the elastic member.

7. The optical fiber connector according to claim 6, wherein a protrusion is formed at an end of the guide ferrule bush, and one end of the reinforcing sleeve surrounds the protrusion, so that the ferrule, the guide ferrule bush and the reinforcing sleeve are integral.

8. The optical fiber connector according to claim 6, wherein said reinforcing sleeve is formed of a thermal contraction tube having a thermal adhering layer in the interior of the same.

9. The optical fiber connector of claim 6, wherein a clamping device is installed at an end of a boot positioned at an outer side of the reinforcing sleeve of the optical fiber connector for clamping with respect to the main optical fiber, and said clamping device comprises a clamp part having a clamping protrusion on an inner surface the diameter of which changes with respect to an external force, and a pressing ring which is installed at an outer side of the clamp part and has a taper at an inner surface of the pressing ring for applying an external force to the clamp part.

10. The optical fiber connector of claim 6, wherein said guide ferrule bush is inserted into a plug frame and is fixed by a stopper, and said the guide ferrule bush is movable in a longitudinal direction of the optical fiber, and the rotation in the axial direction of the optical fiber is fixed.

11. A method for assembling the optical fiber connector according to claim 6, comprising:
engaging a ferrule assembly of the ferrule optical fiber which coating of the ferrule optical fiber is not peeled off at a holder of the fusion splice unit; and
engaging the holder at a holder engaging part of a peeling device and performing a hot peeling procedure.

12. An optical fiber connector, comprising:
a ferrule optical fiber enclosed in a ferrule, the ferrule being elastically supported by an elastic member;

a main optical fiber, wherein the ferrule optical fiber and the main optical fiber are fusion-spliced by a fusion splice unit, which comprises a fusion splice part, wherein the fusion splice part is reinforced by a reinforcing sleeve, said reinforcing sleeve is formed of a thermal contraction tube having a thermal adhering layer in the interior of the same; and a guide ferrule bush locating between the ferrule and the elastic member, wherein one end of the ferrule is configured to pass through the guide ferrule bush so that the guide ferrule bush encloses a part of the ferrule.

13. An optical fiber connector, comprising:

a ferrule optical fiber enclosed in a ferrule, the ferrule being elastically supported by an elastic member;

a main optical fiber, wherein the ferrule optical fiber and the main optical fiber are fusion-spliced by a fusion splice unit, wherein a fusion splice part is reinforced by a reinforcing sleeve, wherein a non-peeled ferrule optical is engaged at the ferrule optical fiber, and a holder of the fusion splice unit encloses the ferrule optical fiber which is engaged at the holder engaging part of a peeling device; and a guide ferrule bush locating between the ferrule and the elastic member, wherein one end of the ferrule is configured to pass through the guide ferrule bush so that the guide ferrule bush encloses a part of the ferrule.

14. A method for assembling the optical fiber connector according to claim 1, comprising:

engaging a ferrule assembly of the ferrule optical fiber which coating of the ferrule optical fiber is not peeled off at a holder of the fusion splice unit; and engaging the holder at a holder engaging part of a peeling device and performing a hot peeling procedure.

15. An optical fiber connector, comprising:

a ferrule optical fiber enclosed in a ferrule, the ferrule being elastically supported by an elastic member; and a main optical fiber, wherein the ferrule optical fiber and the main optical fiber are fusion-spliced by a fusion splice unit, which comprises a fusion splice part, wherein the fusion splice part is reinforced by a reinforcing sleeve, wherein the ferrule optical fiber is integral by the reinforcing sleeve that is configured to move within a stopper, and wherein a protrusion is formed at an end of a guide ferrule bush, and one end of the reinforcing sleeve surrounds the protrusion, so that the ferrule, the guide ferrule bush and the reinforcing sleeve are integral.

16. An optical fiber connector, comprising:

a ferrule optical fiber enclosed in a ferrule, the ferrule being elastically supported by an elastic member; and a main optical fiber, wherein the ferrule optical fiber and the main optical fiber are fusion-spliced by a fusion splice unit, which comprises a fusion splice part, wherein the fusion splice part is reinforced by a reinforcing sleeve, wherein the ferrule optical fiber is integral by the reinforcing sleeve that is configured to move within a stopper, and wherein a clamping device is installed at an end of a boot positioned at an outer side of the reinforcing sleeve of the optical fiber connector for clamping with respect to the main optical fiber, and said clamping device comprises a clamp part having a clamping protrusion on an inner surface the diameter of which changes with respect to an external force, and a pressing ring which is installed at an outer side of the clamp part and has a taper at an inner surface of the pressing ring for applying an external force to the clamp part.

17. An optical fiber connector, comprising:

a ferrule optical fiber enclosed in a ferrule, the ferrule being elastically supported by an elastic member; and a main optical fiber, wherein the ferrule optical fiber and the main optical fiber are fusion-spliced by a fusion splice unit, which comprises a fusion splice part, wherein the fusion splice part is reinforced by a reinforcing sleeve, wherein the ferrule optical fiber is integral by the reinforcing sleeve that is configured to move within a stopper, and wherein a guide ferrule bush is inserted into a plug frame and is fixed by the stopper, and the guide ferrule bush is movable in a longitudinal direction of the main optical fiber, and the rotation in the axial direction of the main optical fiber is fixed.

* * * * *